US008873650B2

(12) United States Patent
Zhuang et al.

(10) Patent No.: US 8,873,650 B2
(45) Date of Patent: Oct. 28, 2014

(54) CONFIGURABLE SPATIAL CHANNEL INFORMATION FEEDBACK IN WIRELESS COMMUNICATION SYSTEM

(75) Inventors: Xiangyang Zhuang, Lake Zurich, IL (US); Krishna Kamal Sayana, Arlington Heights, IL (US); Kenneth A Stewart, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 405 days.

(21) Appl. No.: 12/577,553

(22) Filed: Oct. 12, 2009

(65) Prior Publication Data

US 2011/0085610 A1 Apr. 14, 2011

(51) Int. Cl.
*H04K 1/10* (2006.01)
*H04L 27/28* (2006.01)
*H04L 5/00* (2006.01)

(52) U.S. Cl.
CPC .................. *H04L 5/0037* (2013.01)
USPC ........... 375/260; 375/346; 375/267; 375/299; 375/347; 375/296; 455/500; 455/501; 455/101; 455/504

(58) Field of Classification Search
CPC .............. H04L 27/2647; H04L 5/0007; H04L 27/2657; H04L 27/2662; H04L 5/0048; H04L 1/0618; H04L 1/06; H04L 25/0204; H04L 1/0071; H04L 1/20; H04B 7/0417; H04B 7/0669; H04B 7/0845; H04B 7/0854; H04B 7/0857; H04B 1/1027; H04B 1/123; H04B 1/1036
USPC ......... 375/260, 346, 267, 299, 347, 349, 296, 375/285; 455/500, 101, 501, 504
See application file for complete search history.

(56) References Cited

U.S. PATENT DOCUMENTS

| 7,400,907 | B2 | 7/2008 | Jin et al. |
| 7,433,661 | B2 | 10/2008 | Kogiantis et al. |
| 7,436,896 | B2 | 10/2008 | Hottinen et al. |
| 7,471,963 | B2 | 12/2008 | Kim et al. |
| 7,486,931 | B2 | 2/2009 | Cho et al. |
| 7,599,420 | B2 | 10/2009 | Forenza et al. |

(Continued)

FOREIGN PATENT DOCUMENTS

| CN | 1762137 A | 4/2006 |
| CN | 1859656 A | 11/2006 |

(Continued)

OTHER PUBLICATIONS

Sayana et al., "Method of Codebook Design and Precoder Feedback in Wireless Communication Systems" USPTO U.S. Appl. No. 61/374,241, filed Aug. 16, 2010.

(Continued)

*Primary Examiner* — Phuong Phu
(74) *Attorney, Agent, or Firm* — Faegre Baker Daniels LLP

(57) ABSTRACT

A method for configurable spatial channel information feedback in wireless communication systems is disclosed including receiving, at the wireless communication device, transmission from a plurality of antennas, receiving an indication of a feedback mode for feeding back spatial channel information that is based on correlations among at least some of the plurality of antennas, decomposing a correlation matrix representative of the correlations among at least some of the plurality of antennas into at least two Kronecker components, and feeding back parameters representative of the Kronecker components according to the feedback mode indicated.

7 Claims, 7 Drawing Sheets

(56) References Cited

U.S. PATENT DOCUMENTS

| | | | |
|---|---|---|---|
| 7,649,831 B2 | 1/2010 | Van Rensburg et al. | |
| 7,664,200 B2* | 2/2010 | Ariyavisitakul et al. | 375/296 |
| 7,746,943 B2* | 6/2010 | Yamaura | 375/260 |
| 7,773,535 B2 | 8/2010 | Vook et al. | |
| 7,822,140 B2 | 10/2010 | Catreux et al. | |
| 7,885,211 B2 | 2/2011 | Shen et al. | |
| 8,014,455 B2* | 9/2011 | Kim et al. | 375/260 |
| 8,284,849 B2 | 10/2012 | Lee et al. | |
| 8,542,776 B2* | 9/2013 | Kim et al. | 375/316 |
| 2004/0052314 A1 | 3/2004 | Copeland | |
| 2006/0067277 A1 | 3/2006 | Thomas et al. | |
| 2006/0215618 A1 | 9/2006 | Soliman et al. | |
| 2006/0292990 A1 | 12/2006 | Karabinis et al. | |
| 2007/0211813 A1 | 9/2007 | Talwar et al. | |
| 2007/0255558 A1 | 11/2007 | Yasunaga et al. | |
| 2008/0080449 A1 | 4/2008 | Huang et al. | |
| 2008/0165876 A1 | 7/2008 | Suh et al. | |
| 2008/0274753 A1 | 11/2008 | Attar et al. | |
| 2008/0298482 A1 | 12/2008 | Rensburg et al. | |
| 2009/0067382 A1 | 3/2009 | Li et al. | |
| 2009/0122884 A1 | 5/2009 | Vook et al. | |
| 2009/0270103 A1 | 10/2009 | Pani et al. | |
| 2010/0002657 A1 | 1/2010 | Teo et al. | |
| 2010/0023898 A1 | 1/2010 | Nomura et al. | |
| 2010/0034312 A1 | 2/2010 | Muharemovic et al. | |
| 2010/0035627 A1 | 2/2010 | Hou et al. | |
| 2010/0046650 A1 | 2/2010 | Jongren et al. | |
| 2010/0157924 A1 | 6/2010 | Prasad et al. | |
| 2010/0189191 A1 | 7/2010 | Taoka et al. | |
| 2010/0208838 A1 | 8/2010 | Lee et al. | |
| 2010/0220801 A1 | 9/2010 | Lee et al. | |
| 2010/0317343 A1 | 12/2010 | Krishnamurthy et al. | |
| 2010/0322176 A1 | 12/2010 | Chen et al. | |
| 2011/0051834 A1 | 3/2011 | Lee et al. | |
| 2011/0080969 A1* | 4/2011 | Jngren et al. | 375/267 |
| 2011/0085588 A1 | 4/2011 | Zhuang et al. | |
| 2011/0216840 A1 | 9/2011 | Lee et al. | |
| 2011/0319027 A1 | 12/2011 | Sayana et al. | |
| 2012/0122478 A1 | 5/2012 | Siomina et al. | |

FOREIGN PATENT DOCUMENTS

| | | |
|---|---|---|
| CN | 1984476 A | 6/2007 |
| CN | 101035379 A | 9/2007 |
| EP | 1443791 A1 | 8/2004 |
| EP | 1753152 B1 | 2/2011 |
| KR | 10-2005-0058333 A | 6/2005 |
| WO | 9950968 A1 | 10/1999 |
| WO | 03007508 A1 | 1/2003 |
| WO | 2004021634 A1 | 3/2004 |
| WO | 2004084447 A2 | 9/2004 |
| WO | 2008113210 A1 | 9/2008 |
| WO | 2008137607 A2 | 11/2008 |
| WO | 2008156081 A1 | 12/2008 |
| WO | 2009107090 A1 | 9/2009 |
| WO | 2010118305 A2 | 10/2010 |
| WO | 2010138039 A1 | 12/2010 |

OTHER PUBLICATIONS

Sayana et al., "Method of Precoder Information Feedback in Multi-Antenna Wireless Communication Systems" USPTO U.S. Appl. No. 61/331,818, filed May 5, 2010.
Korean Intellectual Property Office, Notice of Preliminary Rejection for Patent Application No. 10-2011-7021719 dated Oct. 9, 2012, 10 pages.
3GPP TSG WG1 #55bis, R1-090328 "Some Results on DL-MIMO Enhancements for LTE-A" Motorola; Ljubjana, Slovenia; Jan. 12-16, 2009, 5 pages.
United States Patent and Trademark Office, "Non-Final Office Action" for U.S. Appl. No. 13/081,237 dated Dec. 19, 2012, 6 pages.
Patent Cooperation Treaty, "PCT Search Report and Written Opinion of the International Searching Authority" for International Application No. PCT/US2010/026579 Feb. 4, 2011, 13 pages.
3GPP TS 36.211 V8.6.0 (Mar. 2009) 3rd Generation Partnership Project; Technical Specification Group Radio Access Network; Evolved Universal Terrestrial Radio Access (E-UTRA); Physical Channels and Modulation (Release 8), 82 pages.
United States Patent and Trademark Office, "Non-Final Rejection" for U.S. Appl. No. 12/407,783 dated Oct. 5, 2011, 15 pages.
United States Patent and Trademark Office, "Final Rejection" for U.S. Appl. No. 12/407,783 dated Feb. 15, 2012, 19 pages.
3GPP TSG RAN1 #58; Shenzhen, China; Aug. 24-28, 2009, Motorola, "Comparison of PMI-based and SSF-based MU-MIMO" R1-093421, 5 pages.
3GPP TSG RAN WG1 #58; Shenzhen, China Aug. 24-28, 2009, "Implicit feedback in support of downlink MU-MIMO" Texas Instruments; R1-093176, 4 pages.
3GPP TSG RAN WG1 #57bis; Los Angeles, USA; Jun. 29-Jul. 3, 2009, "Feedback considerations for DL MIMO and CoMP" Qualcomm Europe; R1-092695, 6 pages.
3GPP TSG RAN WG1 #60; San Francisco, USA Feb. 22-26, 2010, "Companion Subset Based PMI/CQI Feedback for LTE-A MU-MIMO " RIM; R1-101104; 8 pages.
3GPP TSG RAN WG1 #56; Athens, Greece; Feb. 9-13, 2009, "'Best Companion' reporting for improved single-cell MU-MIMO pairing" Alcatel-Lucent, R1-090926, 28 pages.
Patent Cooperation Treaty, "PCT Search Report and Written Opinion of the International Searching Authority" for International Application No. PCT/US2011/039214 Sep. 14, 2011, 9 pages.
United States Patent and Trademark Office, "Non-Final Rejection" for U.S. Appl. No. 12/823,178 dated Aug. 23, 2012, 16 pages.
Patent Cooperation Treaty, "PCT Search Report and Written Opinion of the International Searching Authority" for International Application No. PCT/US2011/045209 Oct. 28, 2011, 14 pages.
3GPP TSG RAN WG1 #61bis, R1-103970, "Feedback Codebook Design and Performance Evaluation" LG Electronics, Dresden, Germany, Jun. 28-Jul. 2, 2010, 6 pages.
3GPP TSG RAN WG1 #61bis, R1-103804, "Double codebook design principles" Nokia, Nokia Siemens Networks, Dresden, Germany, Jun. 28-Jul. 2, 2010, 10 pages.
3GPP TSG RAN WG1 #61, R1-103026, "View on the feedback framework for Rel. 10" Samsung, Montreal, Canada, May 10-14, 2010, 16 pages.
3GPP TSG RAN WG1 #60, R1-101219, "Views on Codebook Design for Downlink 8Tx MIMO" NTT DoCoMo, San Francisco, USA, Feb. 22-26, 2010, 10 pages.
3GPP TSG RAN WG1 #60, R1-102904, "Two-Level Codebook design for MU MIMO enhancement" ZTE, Montreal, Canada, May 10-14, 2010, 8 pages.
3GPP TSG RAN WG1 #60, R1-101129, "On Extensions to Rel-8 PMI Feedback" Motorola, San Francisco, USA, Feb. 22-26, 2010, 4 pages.
Patent Cooperation Treaty, "PCT Search Report and Written Opinion of the International Searching Authority" for International Application No. PCT/US2011/034959 Aug. 16, 2011, 13 pages.
3GPP TSG RAN WG1 #60bis, R1-102380, "DL Codebook design for 8Tx precoding" LG Electronics, Beijing, China, Apr. 12-16, 2010, 4 pages.
3GPP TSG RAN WG1 #60bis, R1-101859, "Development of two-stage feedback framework for Rel-10" Alcatel-Lucent Shanghai Bell, Alcatel-Lucent, Beijing, China Apr. 12-16, 2010, 6 pages.
3GPP TSG RAN WG1 #59bis, R1-100251, "Extensions to Rel-8 type CQI/PMI/RI feedback using double codebook structure" Huawei, Valencia, Spain, Jan. 18-22, 2010, 4 pages.
3GPP TSG RAN1 #61, R1-103328, "Two Component Feedback Design and Codebooks" Motorola, Montreal, Canada, May 10-14, 2010, 8 pages.
3GPP TSG RAN WG1 #55bis, Ljubljana, Slovenia; Jan. 12-19, 2009, "On OTDOA in LTE" Qualcomm, R1-090353, 8 pages.
3GPP TSG RAN WG1 #55bis; Ljubljana, Slovenia; Jan. 12-16, 2009, "Improving the hearability of LTE Positioning Service" Alcatel-Lucent, R1-090053, 5 pages.
3GPP TSG RAN #42, Athens, Greece, Dec. 2-5, 2008, "Positioning Support for LTE" Article 39, 3GPP TR 21.900; RP-080995, 6 pages.
3GPP TSG RAN WG4 (Radio) #20, New Jersey, USA; Nov. 12-16, 2001, "UTRAN SFN-SFN observed time difference measurement &

(56) References Cited

OTHER PUBLICATIONS

3GPP TS 25.311 IE 10.3.7.106 "UE positioning OTDOA neighbour cell info' assistance data fields, TDOC R4-011408, 4 pages.

3GPP TR 36.814 V9.0.0 (Mar. 2010) 3rd Generation Partnership Project; Technical Specification Group Radio Access Network; Further Advancements for E-UTRA Physical Layer Aspects (Release 9), 103 pages.

United States Patent and Trademark Office, "Notice of Allowance and Fee(s) Due" for U.S. Appl. No. 13/188,419 dated May 22, 2013, 9 pages.

United States Patent and Trademark Office, "Non-Final Office Action" for U.S. Appl. No. 12/407,783 dated Sep. 9, 2013, 17 pages.

The State Intellectual Property Office of the People'S Republic of China, "Notification of the First Office Action" for Patent Application No. 201080011891.0 dated Oct. 8, 2013, 6 pages.

IEEE 802.16 Broadband Wireless Access Working Group "IEEE 802.16m System Description Document [Draft]" Nokia, Submitted Feb. 7, 2009, 171 pages.

Sayana et al., "Method of Codebook Design and Precoder Feedback in Wireless Communication Systems" U.S. Appl. No. 61/374,241, filed Aug. 16, 2010.

3GPP TSG RAN WG1 #61bis; Dresden, Germany; Jun. 28-Jul. 2, 2010; Samsung, "A feedback framework based on W2W1 for Rel. 10" R1-103664, 19 pages.

3GPP TSG RAN WG1 #61bis; Dresden, Germany; Jun. 28-Jul. 2, 2010; Huawei, "Performance evaluation of adaptive codebook as enhancement of 4 Tx feedback" R1-103447, 4 pages.

3GPP TSG RAN WG1 #61bis; Dresden, Germany; Jun. 28-Jul. 2, 2010; AT&T, "Rationale for mandating simulation of 4Tx Widely-Spaced Cross-Polarized Antenna Configuration for LTE-A MU-MIMO" R1-104184, 6 pages.

3GPP TSF RAN WG1 #61bis; Beijing, China; Apr. 12-16, 2010; Erisson, ST-Ericsson, "Further Refinements of Feedback Framework" R1-101742, 8 pages.

Syed Ali Jafar, Andrea Goldsmith; "On Optimality of Beamforming for Multiple Antenna Systems with Imperfect Feedback" Department of Electrical Engineering, Stanford University, CA, USA; 7 pages.

Eugene Visotsky and Upamanyu Madhow; "Space-Time Transmit Precoding With Imperfect Feedback" IEEE Transactions on Inforamtion Theory, vol. 47, No. 6; Sep. 2001, pp. 2632-2639.

Sayana et al., "Method of Precoder Information Feedback in Multi-Antenna Wireless Communication Systems" U.S. Appl. No. 61/331,818, filed May 5, 2010.

3GPP TSG RAN WG1 #61bis; Beijing, China; Apr. 12-16, 2010; Erisson, ST-Ericsson, "Further Refinements of Feedback Framework" R1-101742, 8 pages.

The State Intellectual Property Office of the People'S Republic of China, "Notification of the First Office Action" for Patent Application No. 201080025882.7 dated Feb. 8, 2014, 10 pages.

European Patent Office, "Exam Report" for European Patent Application No. 10737679.0 dated Feb. 21, 2014, 6 pages.

United States Patent and Trademark Office, "Non-Final Rejection" for U.S. Appl. No. 12/899,211 dated May 22, 2013, 18 pages.

United States Patent and Trademark Office, "Final Rejection" for U.S. Appl. No. 12/899,211 dated Oct. 24, 2013, 18 pages.

European Patent Office, "Extended European Search Report" for European Patent Appliction No. 12196328.4 dated Feb. 26, 2014, 7 pages.

3GPP TSG RAN2 #60bis, Tdoc R2-080420 "Text proposal on measurements" Motorola, Sevilla, Spain, Jan. 14-18, 2008, 9 pages.

3GPP TSG WG1 #48, Tdoc R1-071250 "LS on LTE measurement supporting Mobility" St Louis, USA, Feb. 12-16, 2007, 2 pages.

European Patent Office, "Extended European Search Report" for European Patent Application No. 12196319.3 dated Feb. 27, 2014, 7 pages.

United States Patent and Trademark Office, "Non-Final Rejection" for U.S. Appl. No. 12/899,211 dated Apr. 10, 2014, 13 pages.

United States Patent and Trademark Office, "Non-Final Rejection" for U.S. Appl. No. 12/813,221 dated Oct. 8, 2013, 11 pages.

* cited by examiner

100

CONFIGURABLE SPATIAL CHANNEL INFORMATION FEEDBACK IN WIRELESS COMMUNICATION SYSTEM

FIELD OF THE DISCLOSURE

The present disclosure relates generally to wireless communications and, more particularly, to configurable spatial channel information feedback in wireless communication systems.

BACKGROUND

In wireless communication systems, knowledge of antenna correlations at a transmitter, for example, a base station, is important for beam-forming transmissions (also referred to as precoding) that deliver more power to a targeted user while minimizing interference on other users. Precoding operations can be in the context of single-user multiple input multiple output (SU-MIMO) or multi-user MIMO (MU-MIMO), where two or more users are served by a single base station. Precoding operations may also be in the context of SU/MU-MIMO users served by coordinated multiple points (CoMP) transmission. Due to the large number of antennas involved in such transmissions (8-Tx eNB, CoMP, etc.), it is desirable that the base station flexibly configure the computation, parameterization and reporting of antenna correlation to reduce feedback overhead.

In research publications, complete channel knowledge at the transmitter is assumed, which relates to antenna correlation since it is derived from the channel. However, the practical mechanism of how to obtain such knowledge is unaddressed and is generally left to the air interface design. In existing 4G air interface specifications such as the Third Generation Partnership Project Long Term Evolution (3GPP LTE) and IEEE 802.16e, there is no feedback of any kind of antenna correlation. In IEEE 802.16m that is under standardization, the practice of antenna correlation reporting is limited to the correlation matrix computed across all transmit antennas in a non-configurable fashion. The dimension of a correlation matrix depends on the number of antennas involved in the transmission. The number of unique entries of the correlation matrix also grows in proportion to the square of the dimensionality, which is the number of antennas for which their correlations need to be computed. The increasing number of entries of the correlation matrix will incur a significant overhead causing a feedback bottleneck. A configurable method that can parameterize the antenna correlation more efficiently and take advantage of any redundancy introduced by antenna array configurations, such as long term channel behavior, is desirable.

Further, CoMP approaches can potentially perform joint precoding and transmission from a super-set of antennas corresponding to all the coordinating points. These coordinating points may be individual cells or sectors, remote radio heads (RRHs), relays, HeNBs, pico-cells etc. More generally the coordinating points may be different transmission points in a heterogeneous network. In such cases, a transmitter may prefer to obtain feedback on a large number of antennas corresponding to these transmission points.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
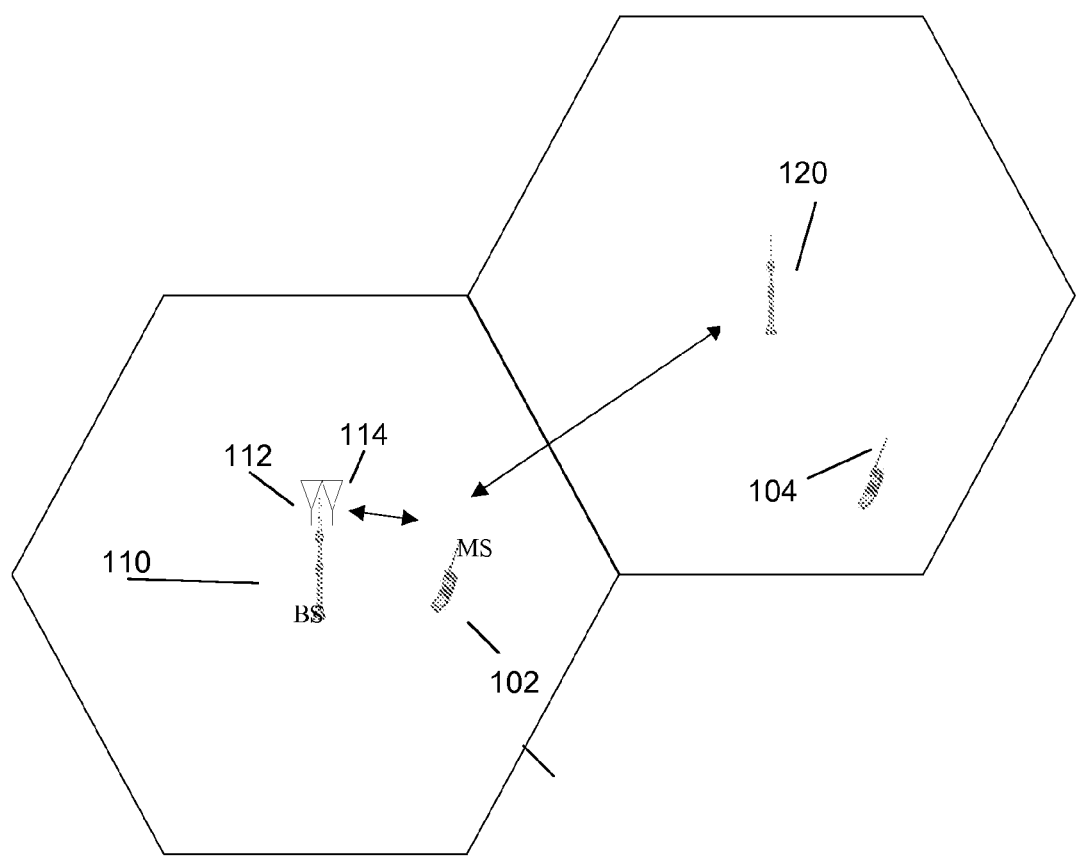
FIG. 1 illustrates a wireless communication system.

In FIG. 1, a wireless communication system 100 comprises one or more fixed base infrastructure units 110 and 120 forming a network distributed over a geographical region for serving remote units in the time and/or frequency domain. The base infrastructure unit may also be referred to as the transmitter, access point (AP), access terminal (AT), base, base station (BS), base unit (BU), Node-B (NB), enhanced Node-B (eNB), Home Node-B (HNB), Home eNB (HeNB) or by other terminology used in the art. The base units are generally part of a radio access network that includes one or more controllers communicably coupled to one or more corresponding base units. The access network is generally communicably coupled to one or more core networks, which may be coupled to other packet or data networks, like the Internet and public switched telephone networks (PSTN), among other networks. These and other elements of access and core networks are not illustrated but they are well known generally by those having ordinary skill in the art.

The one or more base units each comprise one or more transmitters for downlink transmissions and one or more receivers for receiving uplink transmissions from the remote units as described further below. The one or more base units serve a number of remote units, for example, remote unit 102 and 104 in FIG. 1, within a corresponding serving area, for example, a cell or a cell sector of the base unit, via a wireless communication link. The remote units may be fixed units or wireless communication devices. The remote unit may also be referred to as a receiver, subscriber station (SS), mobile, mobile station (MS), mobile terminal, user, terminals, user equipment (UE), user terminal (UT) or by other terminology used in the art. The remote units also comprise one or more transmitters and one or more receivers. In FIG. 1, the base unit 110 transmits downlink communication signals to serve remote unit 102 in the time and/or frequency domain. The remote unit 102 communicates directly with base unit 110 via uplink communication signals.

The term "transmitter" is used herein to refer to a source of a transmission intended for receipt by a user or receiver. A transmitter may have multiple co-located antennas each of which emits, possibly different, waveforms based on the same information source. In FIG. 1, for example, antennas 112 and 114 are co-located. A transmitter is typically associated with a cell or a cell sector in the case of a base unit having or serving multiple sectors. If multiple base units participate in a transmission, it is referred to as multiple transmitters even though the transmitters may coordinate to transmit waveforms based on the same information. Also, if a base unit has geographically separated antennas (i.e., distributed antennas with remote radio heads), the scenario is also referred to as "a transmitter". Thus generally one or more base units transmit information from multiple antennas for reception by a remote unit.

Figure 2:
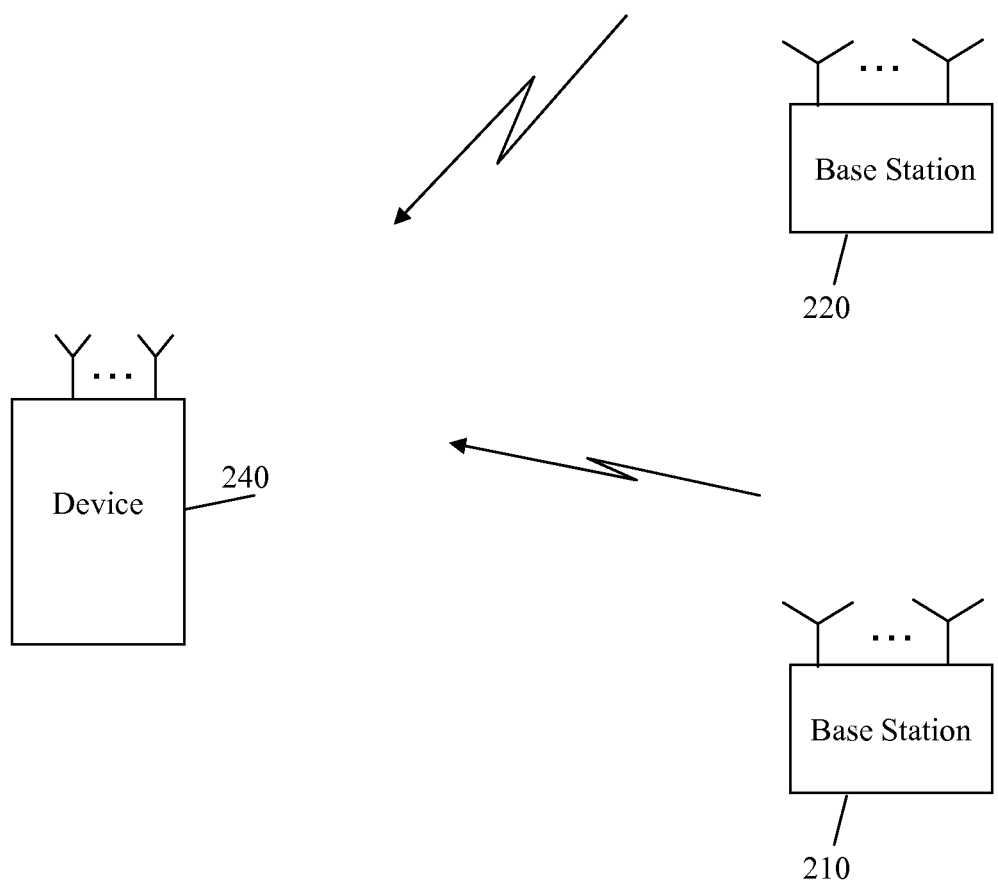
FIG. 2 illustrates an embodiment with multiple base stations that jointly transmit to a single remote unit.

In the diagram 200 of FIG. 2, at 210, a base unit transmits from a plurality of antennas. Also in FIG. 2, a remote unit receives transmissions from a plurality of antennas, which may or may not be co-located. in a typical embodiment, a base unit may be associated with a cell-ID, by which it identifies itself to a remote unit. As a conventional mode of operation, also sometimes referred to as a single-point transmission scheme, a remote unit 240 receives transmissions from a plurality of antennas of a single base unit 220. Such a base unit is also referred to as a serving cell (or serving base unit) to the user device/remote unit. A base unit that is a serving cell may determine that user performance and/or system performance can be improved by simultaneously transmitting data intended for the user from a plurality of antennas that belong to more than one base unit. In FIG. 2, for example, base units 210, 220 transmit together to the remote unit 240. This is referred to as joint transmission or joint processing and both units transmit coherently or non-coherently the data intended for the remote unit. In this case, a serving base unit may request transmission of information on the uplink transmission from the remote unit related to correlation among a plurality of antennas at both base units. Such measurements may be enabled at the remote unit by transmission of reference signals (also referred to as pilot signals) from both base units.

Figure 3:
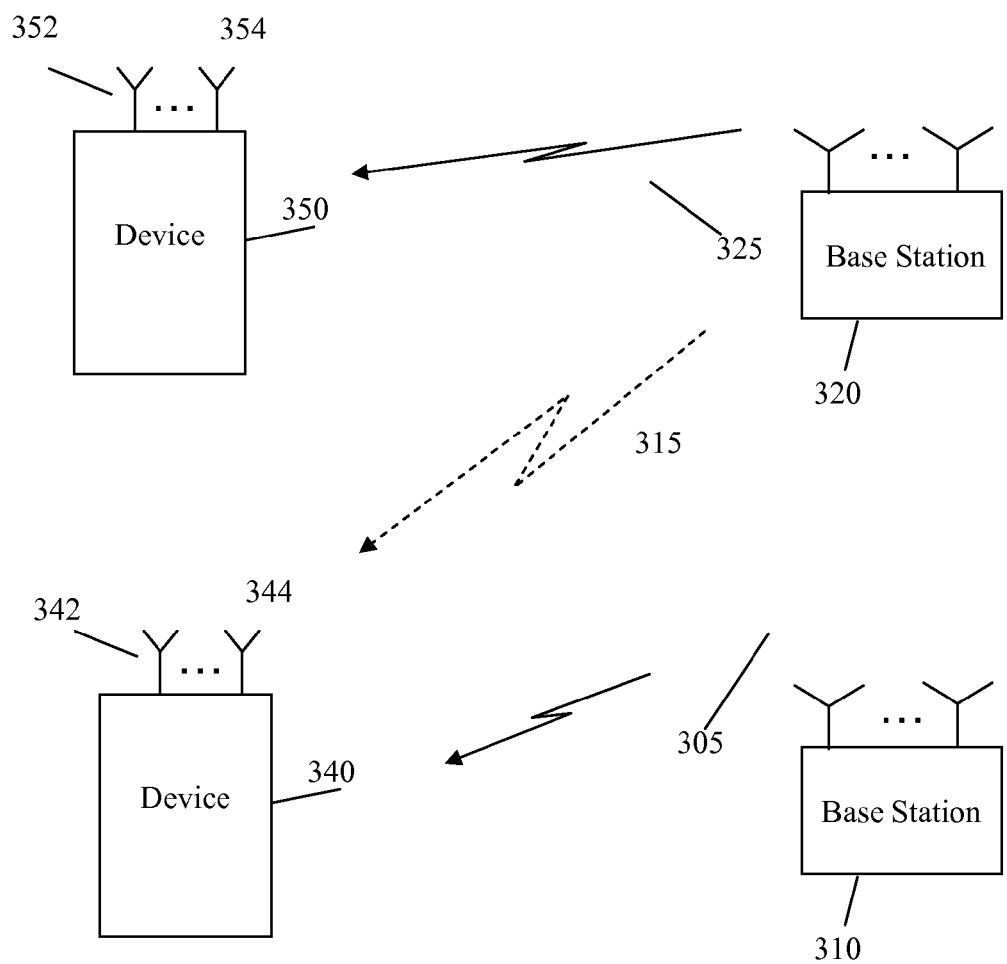
FIG. 3 illustrates another embodiment with multiple base stations that coordinate with interference nulling when serving a remote unit.

In another variation of coordinated multipoint transmission, in FIG. 3 serving base unit 310 and 320 transmit to two remote 340 and 350, respectively. Base unit 310 may improve transmission to its remote unit 340 by active coordination with one or more base units to reduce interference to its user unit, for example, with at-least another base unit 320 performing interference nulling 315 to remote unit 340. The other base units may be simultaneously transmitting data signal 325 to another user unit 350 while minimizing the interference 315 at user unit 340. This is referred to as co-ordinate beamforming and for this operation a serving base unit may also request transmission of correlation information corresponding to the plurality of antennas at both base units In a more general embodiment, a combination of the above two approaches is envisioned. A base unit may be transmitting data to one or more remote units, some of which may be outside its serving area, while performing such transmission to minimize interference with one or more remote units. Efficient operation of such a system often requires that a user unit report correlation information on the uplink, related to plurality of antennas at one or more base units. Often the set of such one or more base units may be referred to as the measurement set for that remote unit.

In one implementation, the wireless communication system is compliant with the Third Generation Partnership Project (3GPP) Universal Mobile Telecommunications System (UMTS) Long Term Evolution protocol, also referred to as Evolved Universal Terrestrial Radio Access (EUTRA), or some future generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. In another implementation, the wireless communication system is compliant with the IEEE 802.16 protocol or a future generation thereof. More generally, however, the wireless communication system may implement some other open or proprietary communication protocol where antenna correlation feedback is useful or desired. Thus the disclosure is not intended to be limited to or by the implementation of any particular wireless communication system architecture or protocol. The teachings herein are more generally applicable to any system or operation that utilizes multiple antennas in a transmission, whether the multiple antennas belong to a single base unit or to multiple base units or whether the multiple antennas are geographically co-located (e.g., belong to a single base unit) or distributed (belong to either remote radio heads or multiple cells) as described more fully below.

In a general embodiment, pilots or reference symbols are sent from each antenna in a transmitter. These pilots occupy the operational bandwidth to allow users to estimate the channel state information (CSI) of the entire bandwidth. Typically the pilots from different antennas are orthogonal so the pilots do not interfere with each other. Such orthogonality can be ensured if the pilots are sent using different time and/or frequency resources or code resources. The different ways of achieving orthogonality are often referred to as time-division multiplexing (TDM) or frequency-division-multiplexing (FDM) or code-division multiplexing (CDM), respectively. For example, in systems based on OFDM technology, the pilots can occupy different subcarriers in frequency or different OFDM symbols in time or share the same set of resources, but different code sequences. In some cases, pilots from different transmitters may not be strictly orthogonal if they are not planned in a coordinated fashion.

Figure 4:
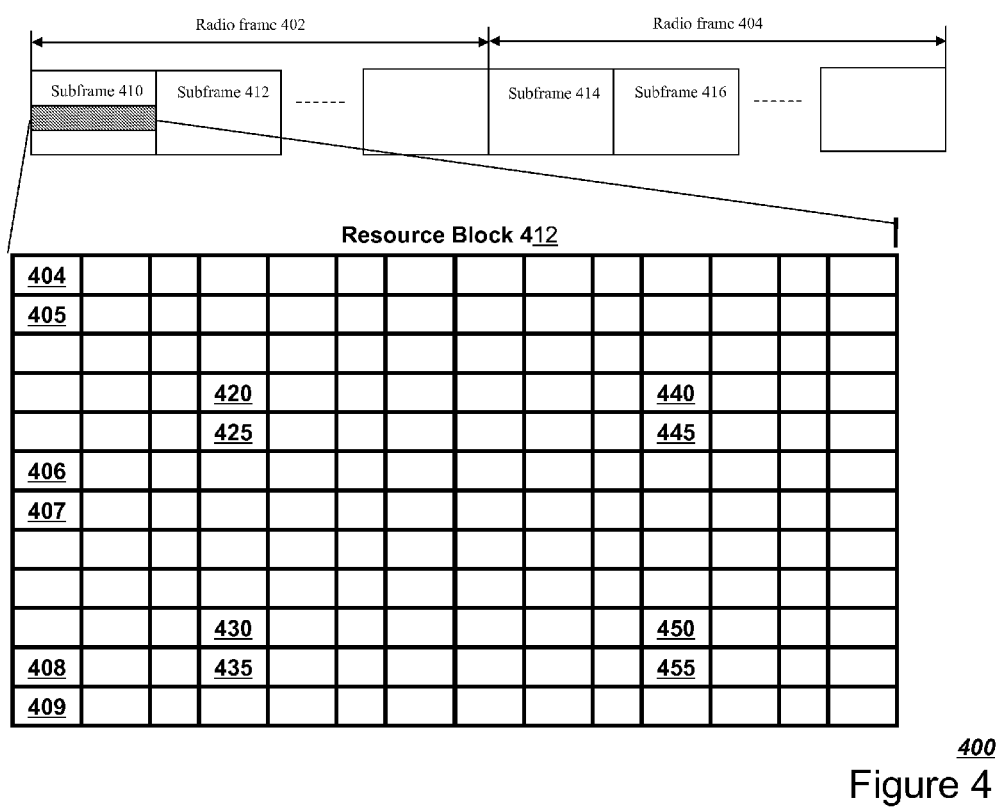
FIG. 4 illustrates an example of a frame structure used in the 3GPP LTE Release-8 (Rel-8) specification and different reference symbols.

In FIG. 4 illustrates a frame structure used in the 3GPP LTE Release-8 (Rel-8) protocol to illustrate possible RS pattern in an OFDM system. A subframe 410 in a radio frame 402 spans 14 OFDM symbols in time. Further a subframe 410 contains multiple resource blocks 412, each spanning 12 consecutive subcarriers in frequency. In typical OFDM based systems like 3GPP LTE, a block of consecutive OFDM symbols are referred to as a subframe. Each sub-carrier location in each of the OFDM symbols is referred to as a resource element (RE), since a single data modulation symbol can be mapped to such a resource element. A resource block (RB) is defined as a block of REs composing a set of consecutive sub-carrier locations in frequency and a set of symbols. In LTE Rel-8, a slot is defined to span 7 symbols and each subframe is made of two slots, and hence 14 symbols. A minimum resource unit allocated to a user is the two RBs corresponding to two slots in a subframe for a total of 2×12×7 REs. A resource block may be more generally defined as a set of resource elements/OFDM subcarrier resources in time and frequency domain.

Some of the REs in a RB are reserved for reference symbols (also referred to as pilots) to help in the demodulation and other measurements at the UE. These reference symbols, as defined in Release 8 specification of LTE can be further divided into two types. The first type is cell-specific reference symbols, which are cell-specific and "common" to all users, and are transmitted in all the RBs. CRS may or may not correspond to actual physical antennas of the transmitter, but CRS are associated with one or more antenna "ports", either physical or virtual. In FIG. 4, as an example only, RE 404, 405, 406, 407, 408, and 409 may be CRS.

The second type is user-specific or dedicated reference symbols (DRS), which are user-specific and hence applicable only to that user, and allocated in the RB's allocated to that user's data. Furthermore, DRS typically correspond to "precoded" or beam-formed RS, which can be directly used by a user for the demodulation of the data streams. Precoding operation is explained later. In FIG. 4, as an example only, RE 420, 425, 430, 435, 440, 445, 450, and 455 may be DRS.

The location of the reference symbols is known to the UE from higher layer configurations. For example, depending on the number of antenna ports as configured by a transmission unit, UE knows the location of all the reference symbols corresponding to all configured antenna ports. As another example, when a UE is instructed to use DRS, the UE also knows the DRS locations which may depend on the user identification.

In typical FDD operation of a LTE Rel-8 system, CRS are used for both channel related measurements at the UE and also for demodulation. If eNB employs a precoder at the transmitter, such information is made available to the UE, which allows it to construct the channel for demodulation based on CRS.

The "precoding" operation is explained in the following. The base station transmits a signal via weighting each antenna signal with a complex value, an operation referred to as precoding, which may be mathematically represented by the matrix equation:

$$Y = HVs + n$$

in which, when transmitting one data stream, or rank-1, may be represented as:

$$\begin{bmatrix} y_1 \\ \vdots \\ y_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} v_1 \\ \vdots \\ v_{N_T} \end{bmatrix} s + n$$

in which, when transmitting two data streams, or rank-2, may be represented as:

$$\begin{bmatrix} y_1 \\ \vdots \\ y_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} v_{1,1} & v_{1,2} \\ \vdots & \vdots \\ v_{N_T,1} & v_{N_T,2} \end{bmatrix} \begin{bmatrix} s_1 \\ s_2 \end{bmatrix} + n$$

where $y_1 \ldots y_{N_R}$ may be the received data at the UE receive antenna #1 to #$N_R$, respectively. In the example with a rank-1 transmission, or a transmission with one data stream denoted as "s", the Matrix V may be a precoding vector with weights $v_{1,1} \ldots v_{N_T,1}$ for base station transmit antenna #1 to #$N_T$ respectively. In an embodiment with a rank-2 transmission, or a transmission with two data streams s1 and s2 on the same subcarrier, V may be a precoding matrix. Matrix H may be the propagation channel matrix between transmit antennas and receive antennas with entry $h_{ij}$ representing a channel between the jth transmit and ith receive antennas. Value n may represent noise and interference. The precoding weights V, either a vector or matrix, may be determined by the base station, typically based on the channel particular to the UE or can be UE-specific and may also take into account a preference indicated by feedback from the UE. Further the matrix HV can be referred to as the effective channel between a user's data streams and its receivers. The effective channel, instead of the propagation channel H, is all a UE needs for demodulation purposes. The precoding weights may or may not be constrained to a predefined codebook that consists of a set of pre-defined vectors or matrices. In an embodiment with constrained precoding, the precoding matrix may be signaled by the base unit efficiently with a precoding matrix index (PMI) or with an index to a precoding matrix within a pre-defined codebook. The term "matrix" may include the degenerated special case of vector. In the most generic sense, the term "precoding" refers to any possible transmission scheme that may be deemed as mapping a set of data streams to an antenna set using a matrix V. The term "precoding" may include an "open-loop" transmission as a special "precoding" with unweighted antennas and any antenna virtualization schemes, such as cyclic delay diversity (CDD).

The applied precoding could be based on corresponding feedback from the UE or channel measurements at a base station. In a simple single-user single base unit scheme, one set of DRS could be defined corresponding to the effective precoded channel (i.e., "HV" in the above equation). If two streams are transmitted to a user in a rank-2 transmission, then only 2 DRS ports (i.e., 2 subsets of DRS each corresponding to a precoded antenna port) are sufficient, even though the actual signal transmission may come from all the $N_T$ antennas at the base unit where $N_T$ can be greater than 2. In FIG. 4, as an example only, RE 420, 440, 430, 450 may correspond to one DRS port while RE 425, 445, 435, 455 may correspond to another DRS port.

In a future migration of a system, for example 3GPP LTE Release 10, user-specific RS (or DRS) may be used widely with advanced Multiple-Input Multiple-Output (MIMO) modes like Coordinated Multipoint transmission (CoMP) and multi-user (MU) MIMO modes described earlier. As described earlier, DRS are sufficient to enable demodulation. In a future specification with CoMP, this is also helpful since eNB is not required to signal exact transmission parameters like precoders, co-ordinating points, etc.

However, an estimate of the actual (un-precoded or explicit) channel is required at the eNB to derive such transmission parameters. So feedback measurements for this purpose are enabled in future LTE revisions by defining lower density reference signals specifically for the purpose of feedback measurements (CSI-RS). Since they do not need to support demodulation, like CRS in LTE Release 8, a lower density is sufficient. Further, with CoMP, CSI-RS may be setup to enable measurements at the user device on a plurality of antennas from multiple base units. In FIG. 4, as an example only, RE 404, 405, 406, 407, 408, and 409 may also be CSI-RS.

From either CRS or CSI-RS or DRS, the remote unit receiver can estimate the CSI. For the OFDM example, the receiver estimates CSI at each subcarrier between each receiver antenna and each transmitter antenna. The CSI may be denoted as a channel matrix on a sub-carrier k represented by $$H_k = \begin{bmatrix} h_{11} & h_{12} & \cdots & h_{1Nt} \\ h_{21} & \vdots & \vdots & \vdots \\ \vdots & \vdots & \vdots & \vdots \\ h_{Nr1} & \cdots & \cdots & h_{NrNt} \end{bmatrix}$$

where $h_{ij}$ is the channel matrix from jth transmit antenna to the ith receive antenna.

In the case of multiple transmit antennas, the CSI-RS may often be divided into a number of subsets, each subset corresponding to a physical antenna port or a "virtual" antenna port where the virtualization process may have a group of radiating elements transmitting the same signal in a fixed manner. In a virtualization process, the signal may be pre-determined based on a base unit implementation, but otherwise common and transparent to all UE devices. In the example of the 3GPP LTE specification, CRS may be divided into 1, 2 or 4 subsets corresponding to 1, 2 or 4 antenna ports whose number is announced by the eNB. The actual physical antennas or radiating elements may belong to one or more such subsets used for virtualization. More generally, virtualization may be viewed as mapping a set of physical radiating elements to a set of common antenna ports, where such virtualization is common to all UEs.

Virtualization may also be performed semi-statically, where the mapping described above may be fixed for a long period of time, apply to one or more UEs in that time period, and may be explicitly or implicitly indicated to the UE.

A correlation between antenna port i and antenna port j may be computed as follows $$R = \frac{1}{|S|}\sum_{k \in S} h_{ki}^* h_{kj}$$

where $h_{ki}$ is the channel measured corresponding to antenna port i on subcarrier k, S is a set of subcarriers, typically corresponding to the whole operational bandwidth or a sub-band.

More generally, an antenna correlation matrix that represents the spatial covariance among a plurality of transmit antennas can be computed as follows $$R = \frac{1}{|S|}\sum_{k \in S} H_k^H H_k = \begin{bmatrix} R_{11} & \cdots & \cdots & R_{1,Nt} \\ \vdots & \vdots & \vdots & \vdots \\ \vdots & \vdots & \vdots & \vdots \\ R_{Nt,1} & \cdots & \cdots & R_{Nt,Nt} \end{bmatrix}$$

The above antenna correlation matrix is Hermitian-symmetric and hence having $N_t(N_t+1)/2$ unique entries ($\{R_{ij}, j \geq i\}$), corresponding to the upper-triangular sub-matrix of R.

The full knowledge of R at the transmitter will enable advanced beamforming/precoding techniques that will improve spectral efficiency and system throughput. Existing 4G air interfaces (i.e., 3GPP LTE and IEEE 802.16e) already support beamforming operation via the precoding operation as described earlier. To support precoding operation from the base station, a user terminal will be reporting back to the base station a preferred Precoding Matrix Index (PMI) which is an index to a set of predetermined precoding matrices. The recommended precoding matrix is obtained at the user terminal based on a certain metric such as maximizing the post-precoding link quality or throughput and is selected from one of the quantized codebook entries, wherein the codebook is known to the transmitter and the receiver. In general, the preferred PMI actually represents a vector quantization of the dominant Eigenspace of R, and hence can be seen as an approximation of R in terms of the closest distance to its dominant Eigenspace or some other distance metric.

With more accurate and more complete knowledge of R, the transmitter will be able to deliver power more efficiently and at the same time minimize interference to other users, once users' respective antenna correlation matrices R are also made available at the base unit. Interference mitigation is important in MU-MIMO operation where multiple users are served at the same time using the same frequency resources— an advanced technique to increase system throughout.

As described earlier, a CoMP scheme can be implemented as a joint transmission (JT) where all participating transmitters are synchronized on the information to be sent to a single user or multiple users. Alternatively, the CoMP scheme may be implemented as coordinated beamforming (CB) where such content synchronization is not required and each participating transmitter sends different information to different users, but both transmission points select beamforming weights to reduce interference to the other user served by other point. In either CoMP scheme, since all the antenna signals sent from multiple transmitters involved in the scheme will affect the received interference, ideally the knowledge of correlation R of all involved antennas is required the base unit(s) to ensure mitigated mutual interference.

As suggested, the knowledge of antenna correlation matrix R can be obtained via feedback from the remote units, as is typically required in an FDD system. However, the feedback overhead is generally a concern. As an example, if a transmitter has $N_t=8$ antennas, the full correlation matrix will be 8×8 with 36 unique entries (exploiting Hermitian symmetry), as opposed to 10 entries in the case of $N_t=4$ antennas. In the example of CoMP transmission from M>1 transmitters, with each having an equal or unequal number of antennas, that transmit in a coordinated way to the same user, then the full correlation matrix will become $MN_t \times MN_t$ (assuming an equal number of antennas per transmitter), which can be a fairly large dimension.

According to one embodiment, the base unit is allowed to configure the computation and reporting of antenna correlation differently to reduce feedback overhead. For example, the base unit may enforce a structure in the correlation matrix information reported by the remote unit. Different parameterizations of the antenna correlation matrix are possible, for example if the base unit has prior knowledge of the antennas involved in a particular transmission and their configurations. Such knowledge however may not be available to the receiver, which can only observe signals, for example, pilot signals, from each of the antennas.

Figure 5:
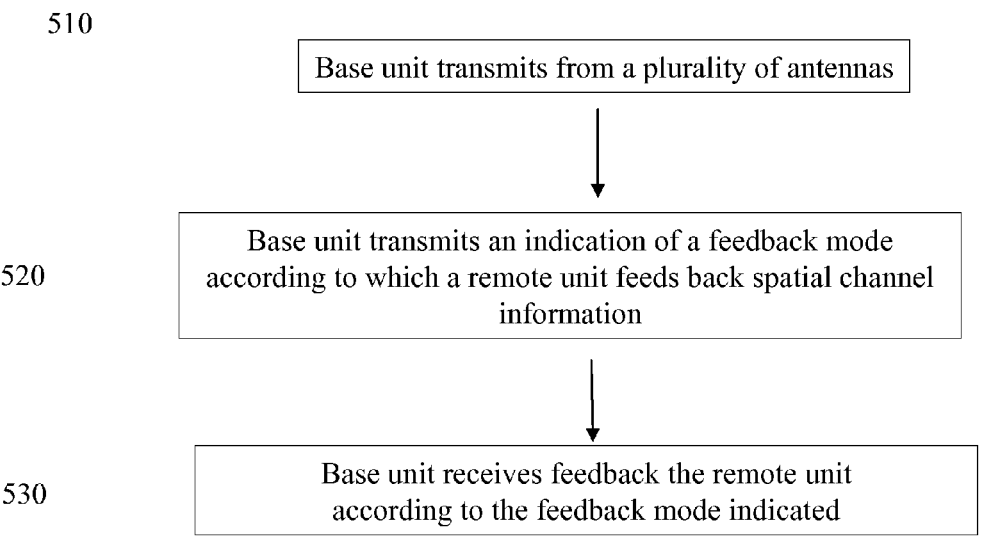
FIG. 5 is a process implemented in a base unit.
Figure 6:
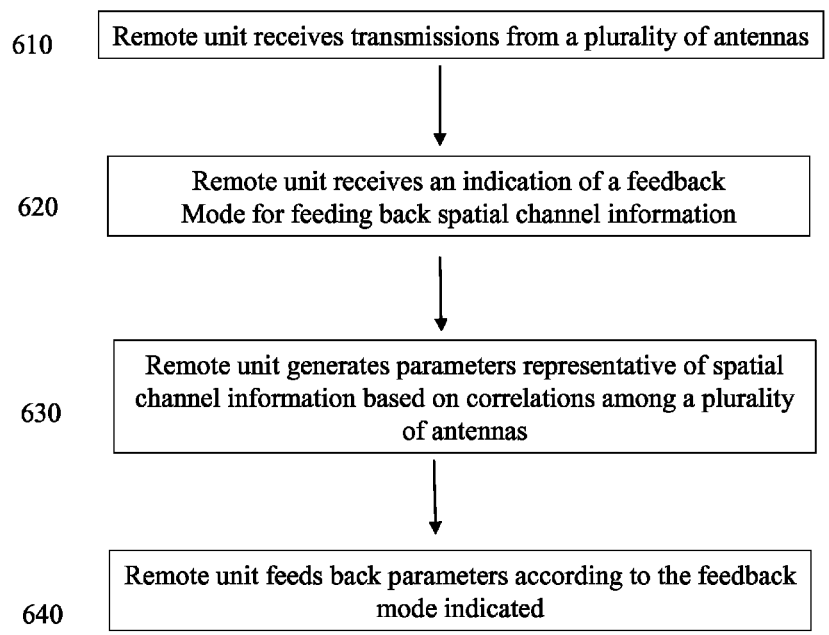
FIG. 6 is a process implemented in a remote unit.

According to a related aspect of the disclosure, in FIG. 5, at 520, the base unit transmits an indication of a feedback mode according to which the remote unit feeds back spatial channel information. In FIG. 6, at 620, the remote unit receives an indication of a feedback mode for feeding back spatial channel information. The remote unit or receiver must generally know what antenna correlation matrix should be computed, how the correlation matrix is to be parameterized and fed back. This information may be communicated to the remote unit explicitly or implicitly. In some embodiments, the remote unit may know some of this information a priori or some of this information may be obtained by some other mechanism.

In one embodiment, the feedback mode indication may identify only the subset of antennas, wherein the remote unit may know by implication or default how to compute and parameterize the antenna correlation matrix. Alternatively, the remote unit may know a priori how to compute and parameterize the antenna correlation matrix.

In another embodiment, where the base unit indicates how to compute and parameterize the antenna correlation matrix, the number of antennas may be determined by default absent an explicit indication of whether to use a subset of antennas. In FIG. 6, at 630, the remote unit generates parameters representative of the spatial channel information based on correlations among antennas according to the mode specified. At 640, the remote unit feeds back the parameters according to the feedback mode indicated. In FIG. 5 at 530, the base unit receives feedback from the remote unit according to the feedback mode indicated. More specific implementations are discussed further below.

One example of a more efficient parameterization is the calculation of a correlation matrix for a subset of the antennas on which the base unit transmits. One configuration could be the reporting of a correlation amongst a subset of antennas belonging to a particular transmitter. Generally, the base unit may specify multiple subsets of antennas on which the antenna correlation matrix is based. For example, the base unit may indicate a feedback mode specifying a first subset of antennas on which a first spatial channel information is based and a second subset of antennas on which a second spatial channel information is based. A user can also be configured to report the antenna correlations of different transmitters using different feedback channels. Different reporting periodicity is also possible.

A more particular feedback mode is the reporting of a cross-correlation matrix between two subsets of antennas belonging to either one transmitter or to different transmitters (even though the two subsets are geographically separated, their cross correlation tends to be small). Consider $$C = \frac{1}{|S|} \sum_{k \in S} (H_k^1)^H H_k^2$$

where $H^1$ and $H^2$ are two CSI sub-matrices at subcarrier-k, corresponding to subsets of antennas from one transmitter or different transmitters. Only part of the cross-correlation matrix may be fed back according to a configuration, for example, one or the average of the diagonal entries of the cross-correlation matrix. For one example, correlation between a group of the antennas, or average over multiple such groups, may be of interest to the transmitter or base unit. More generally, a linear combination of antenna correlations may be fed back.

Another example is the reporting of a closest scaling between two auto-correlation matrices each corresponding to a subset of the plurality of antennas, i.e., $$\alpha = \min_\alpha \|R_1 - \alpha R_2\|_F$$

where $\|A\|_F$ denotes the Frobenious norm of the matrix A. Such an approximation can be useful in special cases of a uniform linear array or even a cross-polarized array. Since $\alpha$ can be any complex value, such a model may be useful to represent the case where $R_1$ is an auto-correlation matrix and $R_2$ is a cross-correlation matrix.

Figure 7:
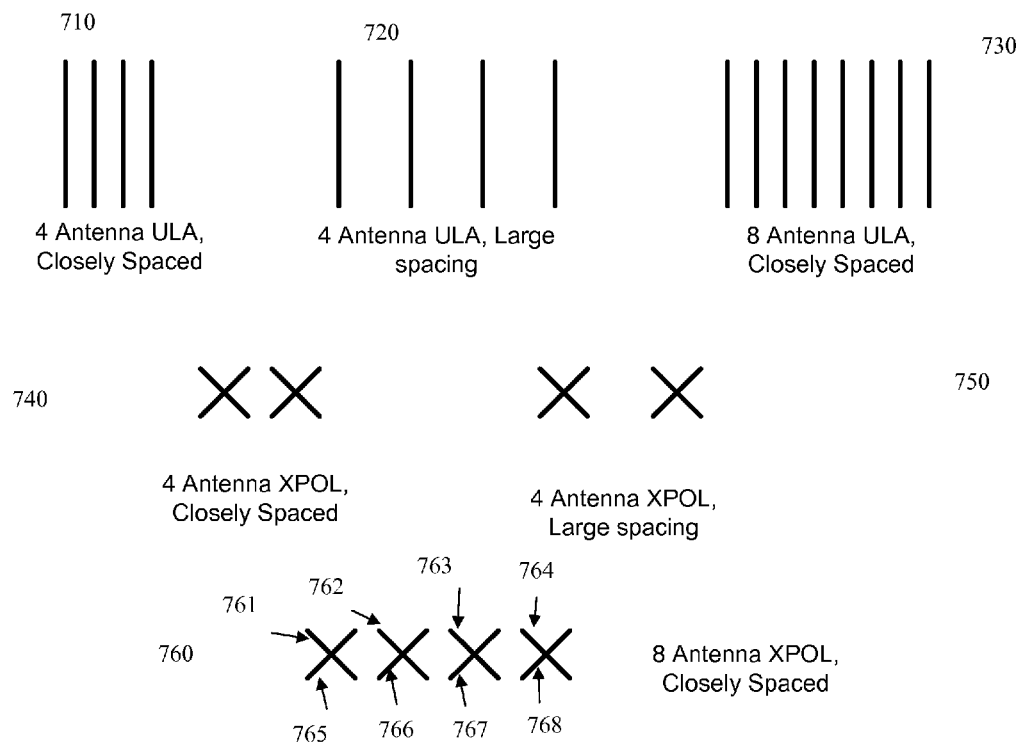
FIG. 7 illustrates exemplary antenna configurations at a base unit.

FIG. 7 illustrates some exemplary antenna configurations at a base unit. A closely spaced ULA, with a typical spacing of 0.5 to 1 wavelengths, is illustrated are 710. A large spaced ULA with typical spacing of 4 to 10 wavelengths, is illustrated are 720. A cross-polarized configuration, with two sets of cross-poles each with two antennas at +/−45 polarizations, is illustrated are 740. Depending on the configuration, the correlation between different antenna elements may have certain structure. Some exemplary cases are described below In one embodiment, the remote unit decomposes a correlation matrix representative of the correlations among at least some of the plurality of antennas into at least two Kronecker components and feeds back the parameters representative of the Kronecker components. In one embodiment, decomposing the correlation matrix into at least two Kronecker components further comprises approximating the correlation matrix as a Kronecker product of the Kronecker components, wherein the approximation is based on a matrix norm. The Frobenius norm is one exemplary matrix norm on which the approximation may be based although other types of matrix norms may be used in other embodiments. Such a feedback mode may be used to enforce reporting an 8×8 matrix corresponding to 8 antennas, as in FIG. 7 at 760, for the transmitter as a Kronecker product of a 4×4 correlation matrix and a 2×2 correlation matrix, i.e., $$R = R_{ULA} \otimes R_{Pol}$$

Conceptually, the ULA Kronecker component $R_{ULA}$ captures the correlation submatrix between subsets with similar ULA configuration, which in 760 are antenna sets (761-764) and (765-768) in FIG. 7. The polarization Kronecker component $R_{Pol}$ captures the correlation submatrix between subsets with similar cross-polarized configuration, namely antenna subsets (761,765), (762,766), (763,767) and (764,768) in FIG. 7. More generally, the spacing/location and polarization of antenna elements introduce some redundant structure in the antenna correlation, which lead to good Kronecker approximations and can be used as effective compression schemes for feedback overhead reduction.

In one embodiment, such an approximation can be obtained based on Frobenius matrix norm $$\min_{R^1, R^2} \|R - R^1 \otimes R^2\|_F$$

In another embodiment, such an approximation may be obtained simply by averaging or linearly combining the correlation matrices of one or more antenna subsets. In the previous example described, $R_{ULA}$ could be a determined by simply averaging correlation matrices of antenna sets (761-764) and (765-768) in FIG. 7.

In another embodiment, the linear combination thus applied may depend on other measurement criterion like availability and accuracy of channel state information on these antenna sunsets and further can be determined by the user device or explicitly indicated by the eNB.

In one embodiment, at least one of the Kronecker components is a Hermitian matrix.

We describe an exemplary algorithm here, which can be used to obtain a Kronecker approximation of a matrix R. If R is of dimension n×n, where n can be decomposed into a product n=n1×n2, then we have the following simplification of the Frobenius norm of the approximation $R = R^1 \otimes R^2$ $$\|R - R^1 \otimes R^2\|_F^2 = \sum_{j=1}^{n_1} \sum_{i=1}^{n_1} \|vec(R_{ij})^T - R_{ij}^1 vec(R^2)^T\|_2^2$$

$$= \sum_{j=1}^{n_1} \|R_j - R^1(:, j) vec(R_2)^T\|_2^2$$

$$= \|\Im(R) - vec(R^1) vec(R^2)^T\|_F^2$$

In the above derivation, the following notation is used
vec(A)—vectorized version of matrix A, stacked column first $$\Im(R) = \begin{bmatrix} Z_1 \\ \vdots \\ Z_{n_1} \end{bmatrix}, \quad Z_j = \begin{bmatrix} vec(R_{1,j})^T \\ \vdots \\ vec(R_{n_1,j})^T \end{bmatrix}$$

$$R_{i,j} = R((i-1)n_2+1:in_2, (j-1)n_2+1:jn_2)$$

(in matlab column notation)

Using the above simplification, the approximation is reduced to a rank-1 approximation problem using a rearranged version of R, denoted as $\Im(R)$. If this matrix has a singular value decomposition (which is typical), the solution can be obtained as $$\Im(R) = U\Sigma V^H, \Sigma = \text{diag}(\sigma_i)$$

$$\text{vec}(B) = \sigma_1 U(:,1)$$

$$\text{vec}(C) = V(:,1)^*$$

The component matrices obtained as above are Hermitian symmetric since the original covariance matrix R is Hermitian symmetric. Though, a square matrix R as considered here as a typical application, the above approach also applies to a covariance matrix of dimension m×n between unequal subsets of antennas.

In one implementation, the parameters representative of the Kronecker components are generated by extracting unique entries from the Kronecker components exploiting Hermitian symmetry. In a more particular implementation, the parameters representative of the Kronecker components are generated by extracting Eigen information according to the feedback mode indicated based on an Eigenvalue decomposition of the Kronecker components. In an exemplary embodiment, the dominant Eigen value and the Eigen vector may be extracted.

In a more general embodiment, a Kronecker approximation as a product of more than two Kronecker components may be used. An example with three is shown below $$R = R^1 \otimes R^2 \otimes R^3$$

As a general embodiment, the Kronecker approximation can be written as below $$R = \sum_{i=1}^{N} R_i^1 \otimes R_i^2 \ldots \otimes R_i^{n_i}$$

as a summation of Kronecker products. In our discussion, we will refer to the component matrices in the above expression as Kronecker components in general.

In another embodiment, the correlation matrix may have to be feedback by the user device over multiple frequency bands and/or multiple time instances. In such a case, different Kronecker components may vary at a different rate in time/frequency. As an exemplary case, in FIG. 7 at 760, the Kronecker approximation described above, the component $R_{ULA}$ changes much slower than $R_{Pol}$ with a closely spaced configuration.

In one implementation, the parameters representative of at least one of the Kronecker components are fed back at a different temporal interval than the parameters representative of another Kronecker component. In the example above, this would be updating the ULA component much slower than a POL component.

In another implementation, the parameters representative of the Kronecker components are fed back according to a feedback mode indicated for a set of sub-bands wherein the parameters representative of at least one of the Kronecker components for the set of sub-bands is the same. A subband comprises of a set of consecutive RBs. Further, the Kronecker approximation may be generalized as follows $$R(n) = R^1(n) \otimes R^2, n = 1.2 \ldots N_{sb}$$

where n is the subband index and $N_{sb}$ is the total number of subbands. The corresponding Frobenius approximation problem will be $$\min_{R^1, \{R^2(n)\}} \sum_{n=1}^{N_{sb}} \|R(n) - R^1(n) \otimes R^2\|_F^2$$

This problem can be solved by simplifying into a rank one problem as follows, $$\min_{R^1, \{R^2(n)\}} \sum_{n=1}^{N_{sb}} \|R(n) - R^1(n) \otimes R^2\|_F^2$$

$$\min_{R^1, \{R^2(n)\}} \sum_{n=1}^{N_{sb}} \left\| \Im(R(n)) - \text{vec}(R^1(n))\text{vec}(R^2)^T \right\|_F^2$$

$$\min_{R^1, \{R^2(n)\}} \sum_{n=1}^{N_{sb}} \left\| \Im(R(n)) - \text{vec}(R^1(n))\text{vec}(R^2)^T \right\|_F^2$$

$$= \left\| \begin{bmatrix} \Im(R(1)) \\ \vdots \\ \Im(R(N_{sb})) \end{bmatrix} - \begin{bmatrix} \text{vec}(R^1(n)) \\ \vdots \\ \text{vec}(R^1(N_{sb})) \end{bmatrix} \text{vec}(R^2)^T \right\|_F^2$$

As illustrated in the previous embodiment, different Kronecker approximations can be obtained by fixing different components. Typically, the structure that minimizes the Frobenius norm, for example keeping ULA fixed as opposed to POL component, is clear from the configuration. In another embodiment, when this is not the case, a UE may choose a format that minimizes the Frobenius norm and indicate such a format to the eNB.

Similar to exploiting the different variations of the components in the frequency domain, one component may be feedback infrequently or with lower periodicity and other components may be fed back more frequently. For example, the remote unit may specify the periodicity of one component and the other component may be fed back by the remote unit only when requested by the base unit. Or different periodicities may be setup.

In a more specific embodiment of the above, the frequently updated may be requested to be feedback, assuming the last update for the other component to allow optimum reconstruction at the base unit. For example, at time t2, where a UE feedbacks frequent component $R^1$, it may derive such components as follows $$\min_{R^1} \|R(t_2) - R^1 \otimes R^2(t_1)\|_F^2$$

where t1 is the last report time of the other component $R^2$.

In some instances, there may be an irregular gap between reporting the components. For example, this could occur if base unit requests updates of each component individually without setting up a periodic report. In such a case, similar to above embodiment, update of one component could be based on the most recent update of the other component More generally, some of the embodiments described above could be applied to components of the more general Kronecker approximation.

The methods outlined so far can be supported as one or more pre-defined feedback modes that in general capture most known antenna configurations. Other typical configurations can be included if necessary. It is also useful, however, to generalize configurability to include configurations that may not be pre-defined and or configurations that in practice may not conform to specific configurations. In such a case, a general description can be outlined for a transmitter to communicate such a configuration. The following example corresponds to the scenario where the receiver is configured to feed back a series of L antenna correlation sub-matrices. A transmitter may send a vector of L matrices $\Omega=\{M_1, M_2, \ldots, M_L\}$, where each matrix $M_i$ is a $N_t \times N_t$ matrix, $N_t$ being the total number of transmit antennas (i.e., a super-set of antennas). Furthermore, each matrix $M_i$ is a matrix of binary elements of 1's and 0's, denoting a selected correlation values to be computed at each time. The receiver interprets this configuration as—for each assigned feedback channel i, it should feedback an average of entries in the covariance sub-matrix corresponding to 1's in $M_i$, i.e., an average of selected correlation values. Here, $\Omega$ defines a selection of correlations to be reported, each of which is an average of one or more correlation matrix entries, and may be indicated by higher layers by simple binary coding at RRC connection setup. Further, this exchange of information can be setup optionally by the transmitter if the antenna configuration is not supported by the set of pre-defined configurations.

Once the appropriate correlation matrix is computed according to the pre-defined configuration, certain parameters are extracted before transmission to the transmitter. For reporting an auto-correlation matrix R, typically only the upper-triangular submatrix of R is extracted. In other examples, further reduction of parameters can be used. One example is the extraction of diagonal entries only. Another example is the main diagonal plus a subset of off-diagonal entries, i.e., first, second, third diagonal, etc. Instead of entries of R, an Eigenstructure of R can also be extracted for feedback such as Eigenvalues and corresponding Eigenvectors.

The extracted parameters can be further transformed by a pre-determined transformation function, e.g., discrete Fourier transform (DFT), to get the transmitted values. The transmitted values can be fed back without any quantization by directly modulating onto base sequences that are mapped to resource elements, or even directly modulating onto resource elements. Alternatively, they can be quantized into binary bits to be encoded and mapped to QPSK/QAM symbols for transmission.

In one embodiment of the extraction, the Eigenvector(s) of the Kronecker components can be mapped to a codebook index, by a distance criterion, and such indices may be feedback by the UE. In addition quantized Eigenvalue(s) may also be feedback.

In various embodiments described above, the correlation entries are among a set of antennas. As briefly described earlier, more generally, the set of antennas could be a set of virtual antennas. If the antennas signaled on the CSI-RS are virtualized at the transmitter, such virtualization is common to all UEs and hence UEs may not be aware of it.

In one embodiment, virtualization may be indicated implicitly. Examples of this case could be the UE-specific DRS used for demodulation and available in its allocated band, or a different, possibly new type of precoded RS that may be defined for one or more UEs or a group of UEs. In such a case, the correlation entries among the virtualized ports may be treated as the correlation entries of the antennas as discussed in various embodiments.

In another embodiment, virtualization may be explicitly indicated to the UE. This would imply some form of precoder indicated to the UE. A UE applies such virtualization to the measured channel on CSI-RS to obtain a new effective channel, now corresponding to the virtual antenna ports. The correlation entries of these antennas can be feedback using various embodiments described herein.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication device for providing spatial channel information feedback, the method comprising:
   receiving, at the wireless communication device, transmissions from a plurality of antennas;
   receiving, at the wireless communication device, an indication of a feedback mode for feeding back first spatial channel information and second spatial channel information, the spatial channel information based on a first subset of the plurality of antennas and the second spatial channel information based on a second subset of the plurality of antennas;
   generating parameters representative of the first spatial channel information based on transmissions from the first sub-set of the plurality of antennas and generating parameters representative of the second spatial channel information based on the transmissions from the second sub-set of the plurality of antennas;
   feeding back, from the wireless communication device, the parameters according to the feedback mode indicated;
   generating the parameters representative of the spatial channel information by extracting Eigen information according to the feedback mode indicated based on an Eigenvalue decomposition of a correlation matrix representative of the spatial channel information for the sub-set of the plurality of antennas specified; and
   generating parameters representative of a third spatial channel information based on cross-correlations between the first sub-set of the plurality of antennas and the second sub-set of the plurality of antennas.

2. The method of claim 1, where the plurality of antennas correspond to a plurality of physical antennas or a plurality of virtualized antennas, wherein a corresponding virtualization is an operation of applying a set of weightings onto a signal before transmission from the plurality of physical antennas.

3. The method of claim 1 further comprising feeding back the parameters representative of the first spatial channel information at a different periodicity than feeding back the parameters representative of the second spatial channel information.

4. The method of claim 1, wherein the feedback mode indicates the first subset of the plurality of antennas and the second subset of the plurality of antennas.

5. The method of claim 1, wherein the first subset of the plurality of antennas comprises antennas of a first transmission point and the second subset of the plurality of antennas comprises antennas of a second transmission point.

6. The method of claim 1, wherein a measurement set comprises the first subset of the plurality of antennas and the second subset of the plurality of antennas, the wireless communication device generating parameters representative of the spatial channel information for elements of the measurement set.

7. The method of claim 1, wherein generating parameters representative of the spatial channel information comprises determining a precoding matrix index to a precoding matrix from a set of predetermined precoding matrices.

* * * * *